United States Patent [19]

Hahn et al.

[11] Patent Number: 4,469,651

[45] Date of Patent: Sep. 4, 1984

[54] PROCESS FOR EXTRUDING THERMOPLASTIC COMPOSITIONS

[75] Inventors: Granville J. Hahn; Raleigh N. Rutledge, both of Big Spring, Tex.

[73] Assignee: Cosden Technology, Inc., Dallas, Tex.

[21] Appl. No.: 494,605

[22] Filed: May 16, 1983

Related U.S. Application Data

[63] Continuation-in-part of Ser. No. 298,362, Sep. 1, 1981, abandoned, which is a continuation-in-part of Ser. No. 110,528, Jan. 9, 1980, abandoned.

[51] Int. Cl.³ .............................................. B29D 27/00
[52] U.S. Cl. .................... 264/40.6; 264/40.7;
    264/50; 264/53; 264/DIG. 5; 264/DIG. 13;
    264/176 R; 425/4 C; 425/143; 425/145;
    425/817 C; 521/79; 521/95; 524/299; 524/371
[58] Field of Search .................... 264/51, 53, 50, 40.6,
    264/40.7, DIG. 5, DIG. 13, 176 R; 425/378 R,
    379 R, 463, 466, 4 C, 143, 145, 817 C; 524/299,
    371; 521/95; 52/79

[56] References Cited

U.S. PATENT DOCUMENTS

| | | | |
|---|---|---|---|
| 2,884,392 | 4/1959 | Clark | 524/299 X |
| 3,117,342 | 1/1964 | Koppehele | 425/466 X |
| 3,310,617 | 3/1967 | Dygert et al. | 264/53 |
| 3,385,917 | 5/1968 | Breukink et al. | 264/51 |
| 3,393,427 | 7/1968 | Larsen | 425/377 X |
| 3,588,955 | 6/1971 | Azuma | 264/53 X |
| 3,642,752 | 2/1972 | Sutter | 425/378 X |
| 3,827,841 | 8/1974 | Kawai et al. | 264/51 X |
| 3,830,901 | 8/1974 | Winstead | 264/51 |
| 4,088,434 | 5/1978 | Fukuda et al. | 425/379 R X |
| 4,166,057 | 8/1979 | Takemori | 524/371 X |
| 4,362,482 | 12/1982 | Rutledge | 425/817 C X |

FOREIGN PATENT DOCUMENTS

| | | | |
|---|---|---|---|
| 47-1698 | 1/1972 | Japan | 264/171 |
| 49-6387 | 2/1974 | Japan | 425/466 |

Primary Examiner—Philip E. Anderson
Attorney, Agent, or Firm—M. Norwood Cheairs; Michael J. Caddell

[57] ABSTRACT

Disclosed is a process for extruding thermoplastic resinous compositions, comprising the steps of heat plastifying the resinous composition in an extruder; cooling the heat plastified resinous composition exiting from the extruder to a uniform temperature desired for extrusion through an extrusion die, including conveying the resinous composition through at least one enclosed flow path in a cooling device, circulating a cooling medium about the entire circumference of each of the resin flow paths and controlling by the means of orifices the flow of thermoplastic at the inlet and the outlet of the cooling device across substantially the entire cross-section of each of the resin flow paths; and, extruding the cooled thermoplastic resinous composition through an extrusion die downstream of the cooling device.

22 Claims, 15 Drawing Figures

PROCESS FOR EXTRUDING THERMOPLASTIC COMPOSITIONS

CROSS REFERENCE TO RELATED APPLICATIONS

This application is a continuation-in-part of U.S. patent application Ser. No. 298,362 filed Sept. 1, 1981 and now abandoned, which was a continuation-in-part of U.S. patent application Ser. No. 110,528 filed Jan. 9, 1980 and now abandoned.

BACKGROUND OF THE INVENTION

The present invention relates to a process for the extrusion of thermoplastic compositions and more especially to a process for the extrusion of foamed thermoplastic compositions. The process disclosed herein is useful for extruding compositions comprising a major portion of at least one thermoplastic resin which is either amorphous or crystalline in nature. The process is characterized by increased throughput rates and higher quality extruded products.

In the conventional process employed in the plastics industry for extruding thermoplastic compositions, beads or pellets of at least one thermoplastic resin and various other additives are introduced into the feed zone of a screw-type extruder. In the extruder, the thermoplastic resin and additives are heated and mixed to form a substantially homogenous, continuous, flowable composition which is then forced by the screw through an extrusion die to produce a product of the desired shape and dimensions.

As the thermoplastic composition passes through the extruder, its temperature increases significantly due to the combined shear and compressive forces applied to the material by the rotating extruder screw. For a given extruder, the magnitude of the temperature increase varies according to the rotation rate of the extruder screw and the shear properties of the particular thermoplastic composition being run. While some heating is desirable and necessary for achieving satisfactory extrusion, excess heat must be removed from the material downstream of the extruder in order to retain the shape and integrity of the extruded product. Typically, this is done by passing the extrudate over chill rolls or through cooling vats downstream of the extrusion die.

Because the temperature of the extrudate exiting the extrusion die is proportional to the rotation rate of the extruder screw when operating under standard conditions (i.e., an increase in throughput requires a higher temperature), conventional extrusion lines have been limited as regards their throughput rates by the capacity of the cooling equipment downstream of the extrusion die. Even where the downstream cooling capacity is adequate, the extrudate can undergo thermal shock if its temperature is reduced too rapidly over a wide temperature differential, thereby adversely affecting its mechanical properties.

Particular problems are encountered in the extrusion of foamed thermoplastic compositions. Extruders of foamed thermoplastic compositions are typically run at high pressures to keep the blowing agent in the polymer condensed until the composition emerges from the extrusion die. If the temperature of the foamed product as it emerges from the extrusion die is significantly greater than that required to achieve satisfactory extrusion, the blowing agent will overexpand once the pressure is relieved, resulting in cell rupture and the loss of dimensional stability and compositional integrity. If the temperature is too low, expansion will be incomplete and poor density properties will result. For some polymers, such as polyethylene, the correct temperature window is only about ±2° F.

Furthermore, the problem is not only one of achieving a specific absolute temperature, but also of achieving uniformity of temperature. If temperature gradients exist within the polymer mass, uneven blowing takes place, again causing ruptured cells and poor density values. At high throughputs, the existence of temperature gradients is more likely to occur.

Therefore, in connection with the extrusion of foam products, it is extremely difficult to obtain an increase in throughput for an extrusion line while at the same time not causing a deterioration in the physical properties of the resulting product, such as the size, uniformity and integrity of the cells and the density value of the foamed polymer. In addition, these problems are exacerbated when, as often desired, various additives are incorporated into the foamed product, such as, for example, a fire-retardant.

Several measures have been taken in the past to solve these problems. For example, it is common to employ two separate extruder screws connected in series. See, e.g., U.S. Pat. No. 3,860,220. In this configuration the screw of the second extruder merely acts as an auger to convey the thermoplastic composition through the extruder, which is jacketed and cooled with a circulating cooling medium. However, the use of a second extruder in this capacity has proven to be very expensive, both from an equipment and an energy standpoint; and it has been found to be an inefficient method for cooling a foamed material. Temperature gradients are actually produced in a second screw, because heat is generated at the screw, while cooling is applied from the outside. Furthermore, because of the high pressures employed in foam extrusion, problems are often encountered with the rear seals of the second extruder screw. Failure of the rear seals can result in damage to the gear box from the escaping polymer as well as undesirable leakage of the blowing agent.

Another solution is to decrease the rotational speed of the extruder screw; however, this measure is obviously antithetical to an increase in extrusion line throughput.

Other measures have included the inclusion of cooling devices in the downstream portion of the extruder (See, e.g., U.S. Pat. Nos. 3,385,917, 3,151,192, 3,444,283 and 3,658,973 and British Pat. No. 2,003,080) or in conjunction with the extrusion die itself (See. e.g., U.S. Pat. Nos. 3,393,427 and 4,088,434 and U.S.S.R. Pat. No. 592,610). These die units are initially very expensive and even more expensive to modify in this manner. Furthermore, they are not effective heat exchange elements, and therefore do not permit significant increases in throughput.

It is also possible to increase the amount of cooling capacity downstream of the extrusion die. See, e.g., U.S. Pat. No. 3,764,642. However, this gives rise to the problem of thermal shock, mentioned above, and moreover, the most essential cooling often is required upstream of the die orifice in order that the resin can be extruded within a certain required temperature range. This is essential in the case of foam extrusion.

Other attempts have been made to interpose some sort of a cooling device between the extruder and the extrusion die. See, e.g., U.S. Pat. Nos. 3,310,617, 3,275,731, 3,751,377, 3,588,955, 3,827,841 and 3,830,901. These efforts have indeed increased the total heat exchange or cooling capacity of the extrusion line; however, they have not been successful in solving the problem of temperature uniformity, as evidenced, for example, by the need to include an additional mixing device downstream of the heat exchange or cooling device, e.g., in U.S. Pat. No. 3,588,955, FIG. 3. Furthermore, while some increase in throughput has been accomplished by these measures (See, e.g., U.S. Pat. No. 3,827,841), it has not been possible to achieve such increases above a certain level, while at the same time producing a foamed product having the desired physical properties.

An extrusion process for thermoplastic composition has therefore been needed which would simultaneously permit increased throughput in an extruder and not result in deterioration of the physical properties of the extruded product. A process was particularly needed which would permit the extrusion of foamed thermoplastic compositions at increased production rates within narrow temperature limits and with excellent physical properties, preferably employing an extruder having a single screw.

SUMMARY OF THE INVENTION

It is therefore an object of the present invention to provide an improved process for extruding thermoplastic resinous materials.

It is also an object of the invention to provide such a process which enables significantly increased throughputs of resinous material through the extrusion line, preferably with the use of a single screw-type extruder.

A further object of the invention resides in providing such a process which enables not only increased throughputs in material but also the production of extruded products having excellent physical properties.

It is a particular object of the invention to provide an improved process for extruding foamed thermoplastic resinous materials, especially those which require precise temperature control and uniformity of temperature.

Another particular object of the invention is to provide such a process which enables significantly increased throughputs of foamed thermoplastic material without deterioration of the physical properties of the foamed product, such as cell size, cell uniformity, density, tear resistance and the like.

It is still another object of the invention to provide a process for extruding foamed thermoplastic material containing significant quantities of additives, such as flame-retardants.

In accomplishing the foregoing objects, there has been provided a process for extruding thermoplastic resinous compositions, comprising the steps of heat plastifying the resinous composition in an extruder and forwarding same in an extrusion direction; cooling the heat plastified resinous composition exiting from the extruder to a uniform temperature desired for extrusion through an extrusion die, the cooling step including conveying the heat plastified resinous composition through at least one enclosed flow path in a cooling device, circulating a cooling medium about the entire circumference of each of the resin flow paths, inserting flow control orifices into the flow stream at the inlet and the outlet of the cooling device across the entire cross-section of each of the resin flow paths; and extruding the cooled resinous composition through an extrusion die downstream of the cooling device. When producing foamed articles, the process further comprises the step of injecting a blowing agent into the resinous composition during the heat plastifying step.

In one preferred embodiment, the heat plastifying step is carried out in an extruder comprising only a single extruder screw. It is also preferred to maintain a volume capacity of resinous composition in the cooling device larger than the volume of heat plastified resinous material in the extruder.

BRIEF DESCRIPTION OF THE DRAWINGS

The invention will be explained in further detail with reference to the accompanying drawings wherein.

DETAILED DESCRIPTION OF THE PREFERRED EMBODIMENTS

Figure 1:
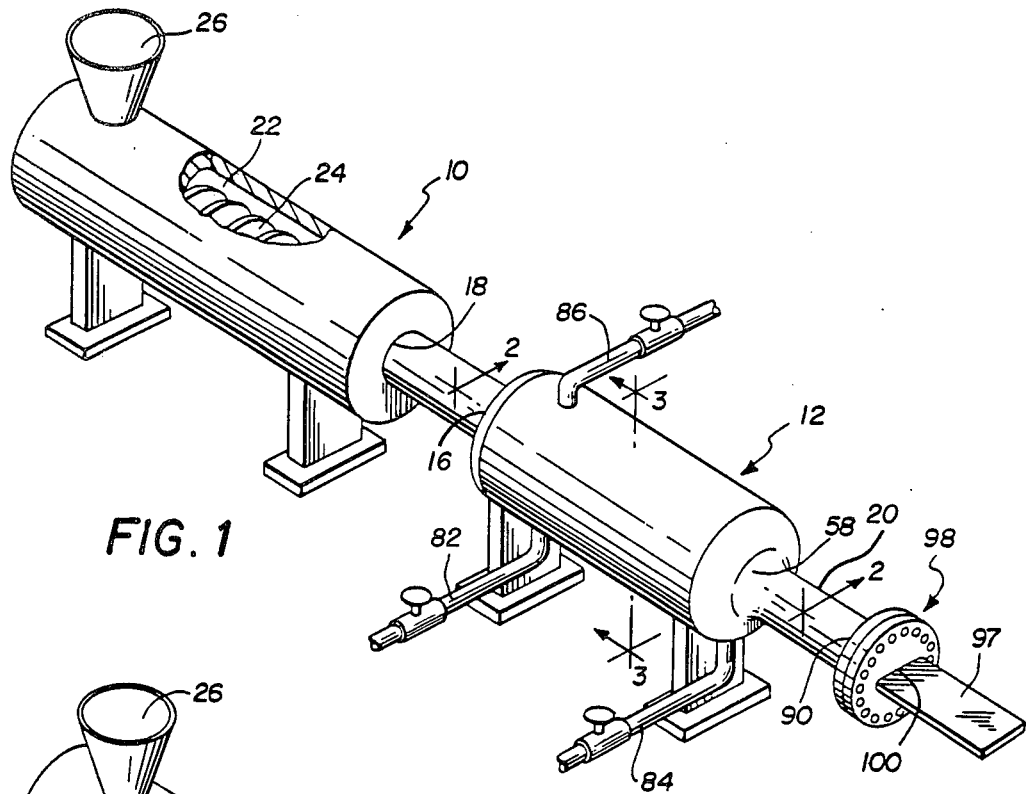
FIGS. 1 and 15 are simplified perspective views of two types of apparatus suitable for carrying out the process disclosed herein for extruding foamed thermoplastic compositions.

FIG. 1 depicts a simplified perspective view of one extrusion apparatus useful for extruding thermoplastic sheet material according to the process of the invention. Beads or pellets of at least one extrudable thermoplastic resin, together with other optional ingredients including without limitation lubricants, coloring agents, fire retardants, ultra-violet light stabilizers, and the like, are blended, placed into a feed hopper, and thereafter provided through feed port 26 to extruder 10.

Satisfactory thermoplastic resins for use in the process of the invention are selected from the group consisting of both crystalline and amorphous polymers.

Preferred thermoplastic resins for use in the subject process include, for example, polystyrene, polyvinyl chloride, acrylonitrile-butadiene-styrene, polyethylene, polypropylene, polyesters such as terephthalates, and the like. Those of ordinary skill will appreciate that various other copolymers and terpolymers of the above-mentioned crystalline and amorphous polymers can also be employed in making the subject compositions.

Extruder 10 is a conventional motor-driven single stage screw-type extruder of the type which is commercially available and well known to those of ordinary skill in the art. As shown in FIG. 1, which is partially cut away, extruder 10 typically comprises barrel 22 having extruder screw 24 positioned therein in such manner that extruder screw 24 is rotatable about its longitudinal axis. As the thermoplastic composition moves from feed port 26 along extruder screw 24, the components therein are further mixed and blended, and subjected to shear and compressive forces which tend to heat the composition, forming it into a substantially homogeneous, continuous flowable mass. Barrel 22 of extruder 10 is generally preheated to prevent the thermoplastic composition from adhering to its inside wall. As the continuous, flowable thermoplastic composition reaches the downstream end of the extruder screw 24, it is forced through extruder outlet port 18 into cooling means 12.

Figure 2:
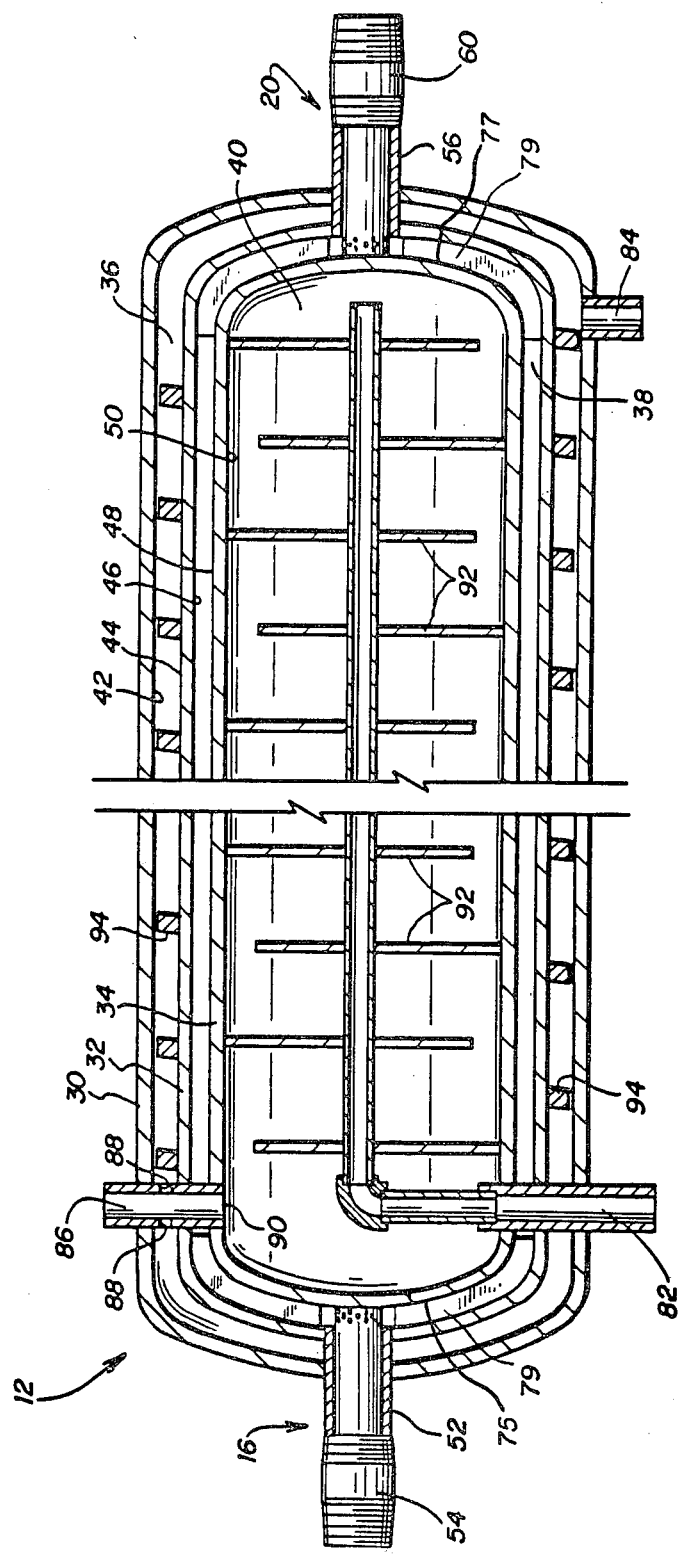
FIG. 2 is a longitudinal sectional elevation view of one cooling means useful for the process of the invention, viewed along line 2—2 of FIG. 1A.

In cooling means 12, heat is transferred from the thermoplastic composition to a circulating cooling medium which enters cooling means 12 through first and second cooling means inlet pipes 82, 84, respectively, and exits through cooling medium outlet pipe 86. Although the exact mechanical configuration of the particular cooling means employed in the process of the invention is not critical, a preferred cooling means that has proven satisfactory for use in the process of the invention is shown in FIG. 2, which is a enlarged longitudinal sectional elevation view taken along line 2—2 of FIG. 1. This preferred cooling means and others will be discussed in more detail hereinbelow.

Referring again to FIG. 1, cooling means outlet port 20 is connected to and in communication with extrusion die 98. Thus, the cooled thermoplastic composition exiting from cooling means outlet port 20 is directed through extrusion die 98 to yield a thin, planar sheet of extrudate 97. Depending upon the size and shape of the aperture in the particular extrusion die employed, the shape and dimensions of the extrudate can vary widely. Because extrudate is typically in a plastic state as it emerges from extrusion die 98, additional downstream cooling by means of chill rolls, water baths, air jets, or the like, is generally required prior to further handling.

Figure 15:
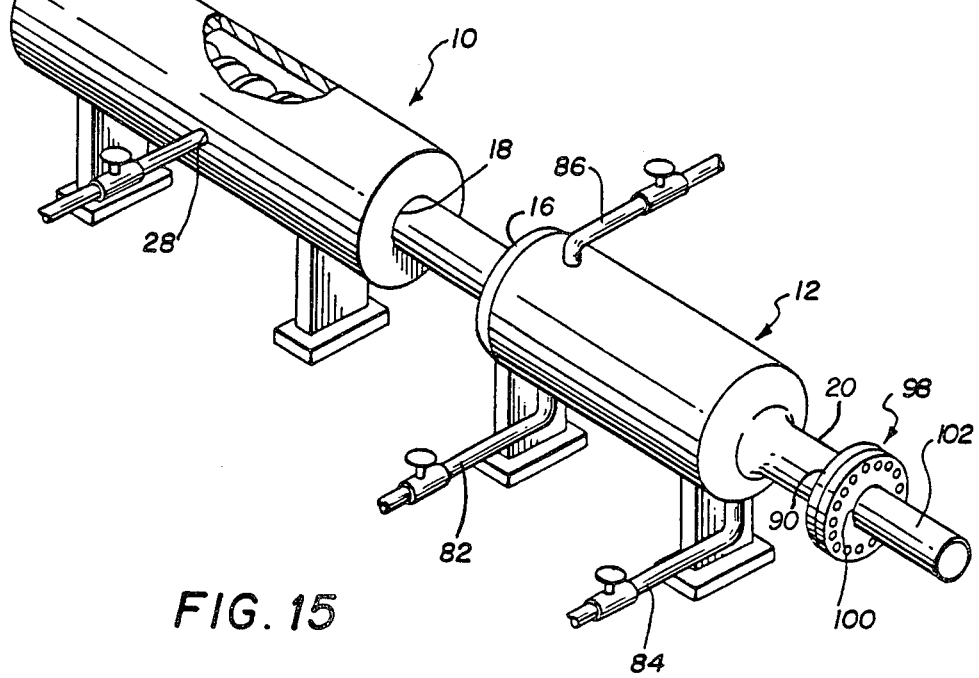

FIG. 15 depicts a simplified perspective view of an apparatus useful in producing foamed thermoplastic compositions according to another preferred embodiment of the process of the invention. Referring to FIG. 15, it will be seen that the apparatus is in most respects identical to that illustrated in FIG. 1. Like elements have been designated by the same reference numeral in each figure. In FIG. 15, however, there is provided a blowing agent inlet port 28 in extruder 10, through which a blowing agent or a mixture of blowing agents is introduced for admixture with the polymer composition in the extruder, in the known fashion. When producing foamed products, a nucleating agent is also typically added to extruder feed hopper 26 along with the polymer pellets.

Preferred thermoplastic resins for use in the disclosed process for making foamed thermoplastic compositions are polyolefins, especially low density polyethylene and polypropylene, and also polystyrene. Those of ordinary skill will appreciate that various other copolymers and terpolymers of the above-mentioned crystalline and amorphous polymers can also be employed in the process of the invention.

Satisfactory nucleators for use in the process of the invention include talc, powdered metals, pigments, or other similar powdery materials whose particles can serve as nuclei on which the tiny droplets of blowing agent can condense as it is injected into the extruder. The particle size of the nucleator material should be extremely fine, and should preferably be able to pass through a 325 mesh screen. It should be noted that other powdery components, including, for example, lubricants, fire retardants and the like, can, when present in the thermoplastic composition, also function to some degree as nucleator during the extrusion process.

Satisfactory lubricants for use in the process of the invention include without limitation any of the powdered lubricants commonly employed for similar applications in the plastics industry. One preferred lubricant comprises a mixture of calcium stearate and Acrawax C (a powdered synthetic wax manufactured by Glyco Chemicals, Inc. of Greenwich, Conn.), which is believed to be an ethylene bis-stearamide. In some cases, the lubricity achieved through the use of synthetic waxes alone may be so great that the cell to cell fusion in the end product is adversely affected. However, by employing a mixture of another powdered lubricant such as calcium stearate in combination with the synthetic wax, this tendency is successfully controlled.

In addition to the foregoing, the composition provided to feed port 26 of extruder 10 can also comprise other optional ingredients including, without limitation, rubbery materials, ionomer resins, coloring agents, ultraviolet light stabilizers, and the like. As the composition is transported by the rotating extruder screw through extruder 10, the components thereof are further mixed and blended, and the plastic and rubbery components are subjected to shearing and compressive forces that tend to heat the composition, forming it into a substantially continuous, flowable mass. As the composition continues down the barrel of extruder 10, blowing agent is injected into the barrel through blowing agent inlet port 28 under high pressure such as, for example, 5000 psi. Once inside extruder 10, the blowing agent is mixed with the thermoplastic composition and condenses around the nucleator particles contained therein. This condensation is enhanced by the fact that the nucleator particles, being very fine, are not sheared by the action of the extruder screw and remain cooler than the surrounding material.

Satisfactory blowing agents for use in the process of the invention include, for example, methyl chloride, carbon dioxide, ammonia, air, normal pentane, isopentane, fluorocarbons, and mixtures thereof. Particularly desirable results have been achieved by employing a major amount of a less volatile blowing agent together with a minor amount of blowing agent having higher volatility. Upon exiting the extrusion die, the more volatile component will rapidly expand to increase the cell size without rupturing the cell wall. Then, as the foamed thermoplastic composition begins to cool, the heavier blowing agent component will aid substantially in preventing undesirable cell shrinkage or collapse.

As the composition continues down the rotating screw past blowing agent inlet port 28 through extruder 10, it is further mixed to form a substantially homogeneous, continuous flowable mass with the blowing agent condensed on the nucleator material distributed therein. Upon reaching extruder outlet port 18, the thermoplastic composition is forced into cooling means 12 in which heat is transferred from the thermoplastic composition to a circulating cooling medium in the same manner as described above with reference to FIG. 1A. Upon exiting cooling means 12, the thermoplastic composition is forced through the annular orifice 100 of extrusion die 98, whereupon it rapidly expands. Expansion of extrudate 102 occurs since the external pressure is reduced to atmospheric level upon exiting extrusion die 98, permitting the blowing agent to expand around each nucleator particle, thereby forming the individual cells. While extrudate 102 is shown in FIG. 1B as a foamed thermoplastic tube, it will be readily understood that the shape and dimensions of extrudate 102 can be varied significantly by the substitution of a different extrusion die.

Figure 3:
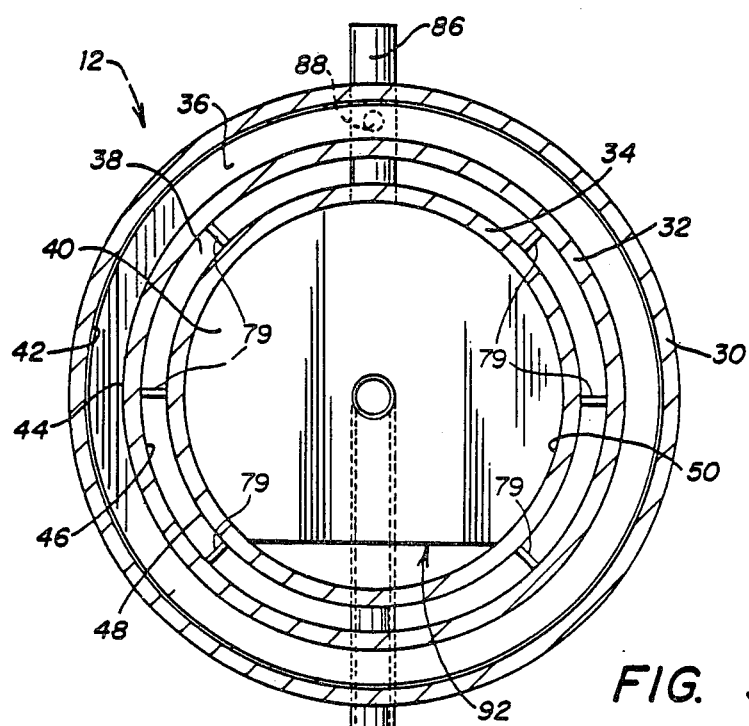
FIG. 3 is a transverse sectional elevation view of the cooling means shown in FIG. 2, viewed along line 3—3 of FIG. 1A.

FIG. 2 is an enlarged longitudinal sectional elevation of one embodiment of cooling means 12 according to the invention, taken along line 2—2 of FIG. 1A. This cooling means 12 preferably comprises a three-chambered, substantially cylindrical vessel adapted to transfer heat from a thermoplastic composition which is received through cooling means inlet port 16 of cooling means 12 from outlet port 18 of extruder 10 shown in FIG. 1. More particularly, cooling means 12 preferably comprises three concentrically and coaxially positioned vessels identified in FIG. 2 as outer vessel 30, middle vessel 32 and inner vessel 34. The three vessels are substantially cylindrical in shape, having annular cross sections as shown in FIG. 3, which is a transverse sectional elevation view taken along line 3—3 of FIG. 1A. The lengths and diameters of the vessels are preferably designed so that inner wall 42 of outer vessel 30 and outer wall 44 of middle vessel 32 are equidistant at all points. Although none are shown in FIG. 2, it will be apparent to those of ordinary skill that positioning pins can be employed where needed to aid in maintaining the alignment of the vessels. The exact spacing in any particular design will depend on the design flow rate and the properties of the fluids involved. The interior space thus defined is identified as outer chamber 36 in FIGS. 2 and 3. Similarly, inner wall 46 of middle vessel 32 and outer wall 48 of inner vessel 34 are preferably equidistant at all points, thereby defining middle chamber 38 for the flow of a heat plastified resinous material. Finally, inner chamber 40 is defined by inner wall 50 of inner vessel 34.

Cooling means 12 is adapted to receive a thermoplastic composition from extruder 10 by attaching cooling means inlet port 16 to the proximal end of middle vessel 32 in such manner that the interior of cooling means inlet port 16 communicates with middle chamber 38. Preferably, as shown in FIG. 2, exterior wall 52 of cooling means inlet port 16 is threaded to receive inlet nozzle 54. Likewise, exterior wall 56 of cooling means outlet port 20 is preferably threaded to receive outlet nozzle 60.

Inlet nozzle 54 and outlet nozzle 60 are further described with reference to enlarged elevation views depicted in FIGS. 4 and 5, respectively. Inlet nozzle 54 and outlet nozzle 60 each comprise threaded engagement members 62, 64 and elongated sleeve members 66, 68, respectively. Elongated sleeve members 66, 68 further comprise longitudinal bores 70, 72 having a diameter which is adequate to accommodate the flow of thermoplastic composition desired to pass therethrough. The length of sleeve members 66, 68 is preferably such that, when engagement member 62 of inlet nozzle 54 or engagement member 64 of outlet nozzle 60 is threaded onto cooling means inlet port 16 or cooling means outlet port 20, respectively, sleeve end faces 74, 76 will contact the end wall of inner vessel 34, as shown in FIG. 2. To permit the thermoplastic composition to flow from inlet nozzle 54 into middle chamber 38 and from middle chamber 38 into outlet nozzle 60, each nozzle further comprises a plurality of small orifices 78, 80 bored in a radial direction through that portion of sleeve members 66, 68 which is positioned inside middle chamber 38 when engagement members 62, 64 of inlet nozzle 54 or outlet nozzle 60 are threadably engaged with their respective ports and the sleeve end faces 74, 76 abut end walls 75, 77 respectively of inner vessel 34.

Orifices 78, 80 are distributed uniformly around the circumference of sleeve members 66, 68 in order to assure that the thermoplastic resin is metered uniformly into middle chamber 38 about its entire entrance circumference, and that it can uniformly converge again into outlet nozzle 60. Although not wishing to be bound by theory, it is believed that orifices 78, 80 cause turbulent flow of the thermoplastic upon exiting therefrom. The turbulent flow causes mixing of the thermoplastic material as it enters and as it exits the cooling means 12, thereby providing increased transfer of heat from the thermoplastic to cooling means 12. Orifices 78, 80 are intended to alleviate the problems which occur when the temperature of the thermoplastic in an arcuate portion of the flow annulus is lower than the remaining thermoplastic resulting in an increase in viscosity and a corresponding decrease in flow velocity for that arcuate portion. The increased viscosity is a self-feeding phenomenon since, as the thermoplastic in one flow annulus or arcuate stream cools, the viscosity of the thermoplastic therein increases resulting in a lower flow velocity, which in turn causes further cooling and further increases in viscosity. This phenomenon is generally known as channelling. The differences in viscosity in various arcuate portions of the flow annulus due to the temperature variations in the thermoplastic creates imperfection in the final product. It has been found that when orifices 78, 80 are removed from cooling means 12, widely varying temperatures occur in the thermoplastic exiting cooling means 12, indicating that channelling or some other similar undesirable effect is occurring. The orifices 78, 80 alleviate these temperature variations in the thermoplastic.

This function of providing uniform distribution and collection flow can be augmented by providing a plurality of baffle or vane members 79 indicated in FIGS. 2 and 3 which are distributed about the circumference of the generally circular outer surface 48 at the end walls 75, 77 and emanate generally radially from the immediate vicinity of inlet and outlet nozzles 54, 60. These baffle or vane members 79 can be positioned between each set of circumferentially adjacent orifices 78, 80 or between groups of circumferentially adjacent orifices 78, 80 to axially align with the longitudinal axis of cooling means 12. Baffle or vane members 79 preferably extend across the entire gap width of middle chamber 38 defined by outer surface 48 and inner surface 46. Baffle members 79 extend from nozzles 54, 60 around the curvature of end walls 75, 77 and into the straight flow portion of middle chamber 38.

As shown in FIGS. 1–3, cooling means 12 further comprises means for receiving and circulating a cooling medium on both sides of middle chamber 38. More particularly, first cooling medium inlet pipe 82 is connected to inner vessel 34 in such a manner that it communicates with inner chamber 40 of cooling means 12. Similarly, second cooling medium inlet pipe 84 shown in FIGS. 1 and 2 is connected to outer vessel 30 so that it communicates with outer chamber 36. Cooling medium inlet pipes 82, 84 are preferably connected to vessels 30, 34, respectively, in such a manner that the cooling medium flowing into cooling means 12 initially contacts outer wall 44 of middle vessel 32 and inner wall 50 of inner vessel 34 near the downstream end of middle chamber 38. When constructed in this manner, the flow of cooling medium through outer chamber 36 and inner chamber 40 is substantially countercurrent to the flow of thermoplastic composition through middle chamber 38, thereby promoting more efficient heat transfer. Cooling means 12 further comprises cooling medium outlet pipe 86 which communicates by means of cooling medium outlets 88, 90 with outer chamber 36 and inner chamber 40, respectively.

A satisfactory cooling medium for use with cooling means 12 is an oil having a flash point higher than the temperature of the thermoplastic composition entering through inlet nozzle 54. Other suitable heat exchange fluids, such as hydraulic fluids and the like, can also be used. After exiting cooling means 12, the cooling medium can itself be cooled such as, for example, with water and then recirculated to first and second cooling medium inlet pipes 82, 84.

To promote heat transfer between the thermoplastic composition and the circulating cooling medium, it is desirable to control the flow of circulating cooling medium through outer chamber 36 and inner chamber 40 in such a manner that it maintains significant surface contact with outer wall 44 of middle vessel 32 and inner wall 50 of inner vessel 34. Satisfactory results have been achieved by means of the flow control devices depicted in FIGS. 2 and 3. More particularly, vertical baffles 92 have been positioned inside inner chamber 40 and affixed to inner wall 50 of inner vessel 34. Similarly, metal band 94 has been spirally wrapped around outer wall 44 of middle vessel 32 and welded thereto to direct the flow of cooling medium entering outer chamber 36 through cooling medium inlet pipe 82 toward cooling medium outlet ports 88, 90.

Referring again to FIG. 15, cooling means outlet port 20 is connected to and communicates with extrusion die 98. Upon exiting cooling means 12, the cooled thermoplastic composition is directed through extrusion die inlet port 90 into and through the annular die orifice 100 of extrusion die 98. In the case of extruding resin compositions containing a blowing agent, the extruded profile undergoes rapid expansion upon exiting the die orifice 100. Expansion of extrudate 102 occurs since the external pressure is reduced to atmospheric level upon exiting extrusion die 98, permitting the blowing agent to expand around each nucleator particle, thereby forming the individual cells.

The advantages achieved by the present invention as regards increased throughput of thermoplastic resin are also attained in the case of a non-foam extrusion process; however, the increases are often not as significant in view of the fact that non-foam processes often have less stringent temperature requirements for the resin as it enters the extrusion die.

Figure 6:
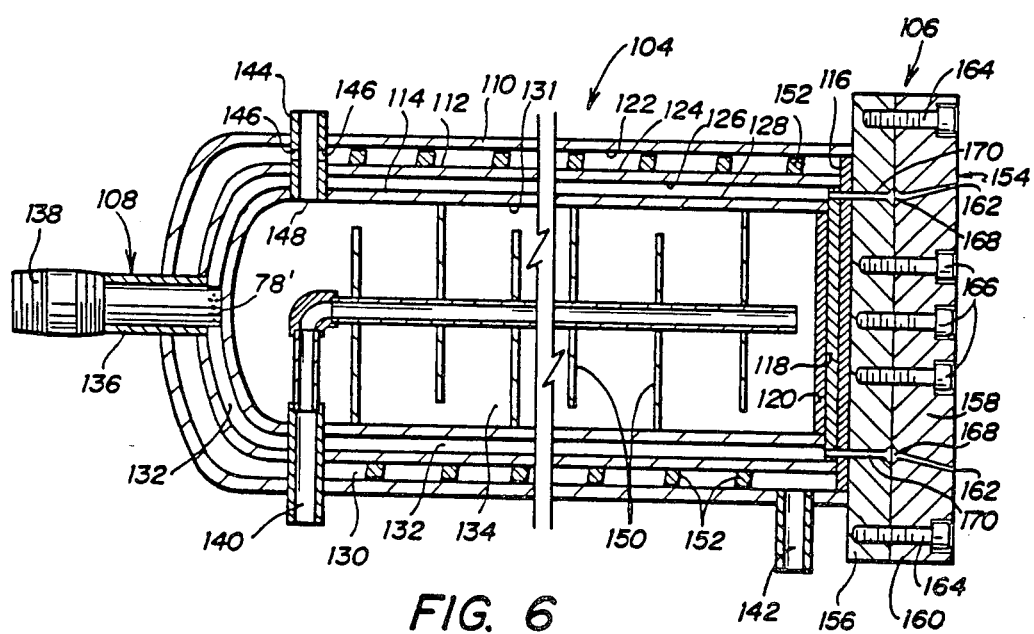
FIG. 6 is a longitudinal sectional elevation view of an alternate embodiment of the cooling means useful for the process of the invention, comprising an extrusion die communicating with and integrally attached to the distal end thereof.

According to another preferred embodiment of the invention, the process may be carried out with an apparatus comprising a novel cooling means having an extrusion die integrally connected to and communicating with the downstream end thereof. A longitudinal sectional elevation view of an apparatus suitable for this embodiment is shown in FIG. 6. Referring to FIG. 6, the subject apparatus comprises cooling means assembly indicated at 104 and extrusion die indicated at 106.

Cooling means 104 preferably comprises a three-chambered, substantially cylindrical vessel adapted to transfer heat from a thermoplastic composition received through inlet port 108 from the outlet port of an extruder, such as that shown in FIG. 1. More particularly, cooling means 104 preferably comprises three concentrically and coaxially positioned vessels identified in FIG. 6 as outer vessel 110, middle vessel 112 and inner vessel 114. The three vessels are substantially cylindrical in cross-sectional shape, and can be conveniently fabricated from commercially available, nominal diameter pipe. The upstream ends of outer vessel 110, middle vessel 112 and inner vessel 114 are enclosed by conventional weld caps; the downstream ends of those vessels are enclosed by flat, circular plates 116, 118, 120 which are welded to the vessels 110, 112, 114 as shown in FIG. 6. The length and diameters of the vessels are preferably selected in such manner that inner wall 122 of outer vessel 110 and outer wall 124 of middle vessel 122 are substantially equidistant at all points. The exact spacing in any particular design will depend on the design flow rate and the properties of the fluids involved. The interior space thus defined is identified as outer chamber 130. Similarly, inner wall 126 of middle vessel 112 and outer wall 128 of inner vessel 114 are preferably equidistant at all points, thereby defining middle chamber 132 for the flow of a thermoplastic resin. Finally, inner chamber 134 is defined by inner wall 131 of inner vessel 114.

Cooling assembly 104 is adapted to receive a thermoplastic composition by attaching inlet port 108 to the upstream end of middle vessel 112 as shown in FIG. 6 in such manner that the bore of inlet port 108 communicates with middle chamber 132. Preferably, exterior wall 136 of inlet port 108 is threaded to receive inlet nozzle 138. Inlet nozzle 138 is the same as inlet nozzle 54 shown in FIG. 4, and the description of that figure may be referred to for the details of inlet nozzle 138.

Cooling assembly 104 is adapted to receive and circulate a cooling medium on both sides of middle chamber 132 through which the thermoplastic composition flows. A satisfactory cooling medium for use with cooling assembly 104 is a conventional low viscosity hydraulic oil which is capable of being pumped and has good temperature stability and a good heat transfer capability. First cooling medium inlet pipe 140 is connected to inner vessel 114 in such manner that it communicates with inner chamber 134 of cooling assembly 104. Similarly, second cooling medium inlet pipe 142 is connected to outer vessel 110 in such manner that it communicates with outer chamber 130. Cooling medium inlet pipes 140, 142 are preferably connected to vessels 114, 110, respectively, in such manner that the cooling medium flowing into cooling assembly 104 initially contacts outer wall 124 of middle vessel 112 and inner wall 131 of inner vessel 114 near the downstream end of middle chamber 132. When constructed in this manner, the flow of cooling medium through outer chamber 130 and inner chamber 134 is substantially countercurrent to the flow of thermoplastic composition through middle chamber 132, thereby promoting more efficient heat transfer. Cooling assembly 104 further comprises cooling medium outlet pipe 144 wich communicates by means of cooling medium outlet ports 146, 148 with outer chamber 130 and inner chamber 14, respectively.

To promote heat transfer between the thermoplastic composition and the circulating cooling medium, it is desirable to control the flow of circulating cooling medium through outer chamber 130 and inner chamber 134 in such a manner that it maintains significant surface contact with outer wall 124 of middle vessel 112 and inner wall 131 of inner vessel 114. Although various means for accomplishing this will be apparent to those of ordinary skill in the art, satisfactory results have been achieved by means of the flow control devices depicted in FIG. 6. More particularly, vertical baffles 150 are positioned inside inner chamber 134 and affixed to inner wall 131 of inner vessel 114. Similarly, metal band 152 is spirally wrapped around outer wall 124 of middle vessel 112 and affixed thereto to direct the flow of cooling medium entering outer chamber 130 through cooling medium inlet pipe 142 toward cooling medium outlet ports 146.

Referring now to FIG. 6, extrusion die assembly 106 preferably comprises extrusion die 154 and flange plate 156. Flange plate 156 is welded to end plate 116 and outer vessel 110 of cooling means assembly 104. Extrusion die 154 is a conventional ring die comprising inner die member 158 and outer die member 160, which together define annular orifice 162. Inner die member 158 and outer die member 160 are mounted on flange plate 156 by means of threaded engagement bolts 164, 166, respectively. Annulus 162 communicates with annular reservoir 168, which in turn communicates with middle chamber 132 of cooling means assembly 104 through a plurality of outlet orifices 170 bored through flange plate 156 and end plates 116, 118 at evenly spaced intervals around the annulus defined by the transverse cross-section of middle chamber 132.

Figure 4:
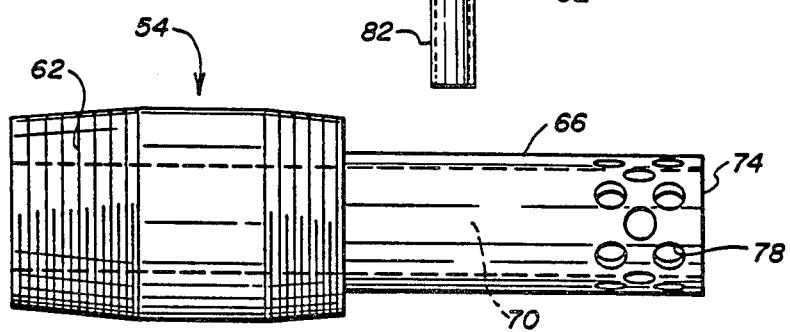
FIG. 4 is an elevation view of a preferred inlet nozzle means for the cooling means shown in FIGS. 1-3.

In this embodiment, a plurality of orifices 78' are provided in inlet nozzle 138, just as in inlet nozzle 54 illustrated in FIG. 4. At the outlet end of cooling means 104, the plurality of outlet orifices 170 are provided in end walls 116 and 118, in order to provide communication between middle chamber 132 and annular extrusion orifice 162 of extrusion die 154. The inlet orifices 78' and the outlet orifices 170 have a similar function as the inlet orifices 78 and outlet orifices 80 in the embodiment of FIGS. 2-4, i.e., they provide a precise control of the flow rates and pressures through the cooling means as well as providing a turbulent flow of thermoplastic about the circumference of inner chamber 132 to produce improved heat exchange through the cooling means 104.

Figure 7:
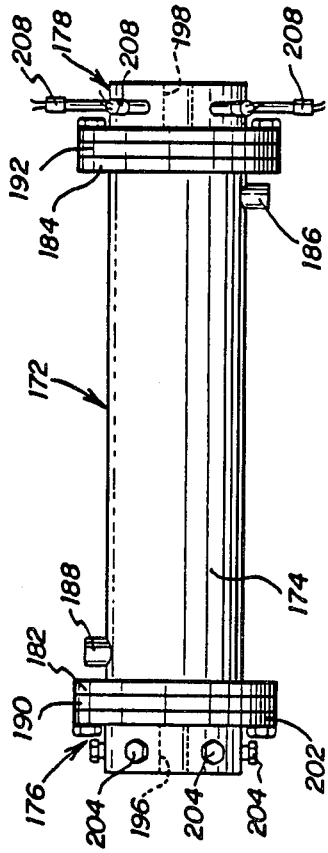
FIG. 7 is a longitudinal elevation view of another embodiment of the cooling means for use in the process according to the invention.

Another embodiment of the subject invention is described with reference to FIGS. 7-14 which illustrate another cooling means useful for carrying out the process of the invention. FIG. 7 depicts a longitudinal elevation view of a cooling means indicated at 172, which is adapted to circulate a cooling medium around a plurality of tubes 194 (FIG. 8) positioned inside shell 174. In addition to shell 174, cooling means 172 comprises inlet valve assembly 176, outlet thermocouple assembly 178, and tube sheet portion 180 which is normally positioned inside shell 174, but for illustrative purposes is shown in FIG. 8 isolated from the shell 174.

Shell 174 is preferably a substantially cylindrical vessel adapted for use in cooling means 172 of the invention by the addition of inlet shell flange 182, outlet shell flange 184, cooling medium inlet port 186, and cooling medium outlet port 188. Tube sheet portion 180 is adapted to be positioned inside shell 174 and bolted thereto by means of inlet tube sheet flange 190 and outlet tube sheet flange 192, or any other functionally equivalent means known to those of ordinary skill in the art. Tube sheet portion 180 comprises a plurality of tubes 194 adapted to transport a thermoplastic polymer composition from polymer inlet port 196 to polymer outlet port 198 through and generally countercurrent to the direction of the cooling medium passing through shell 174. The flow of cooling medium through shell 174 can be further controlled by the addition of baffles 200 or the like to tube sheet portion 180, as shown in FIG. 8. According to one preferred embodiment depicted in FIGS. 7-13, tube sheet portion 180 comprises six metal tubes 194 which are evenly circumferentially spaced about the longitudinal axis of cooling means 172.

Figure 8:
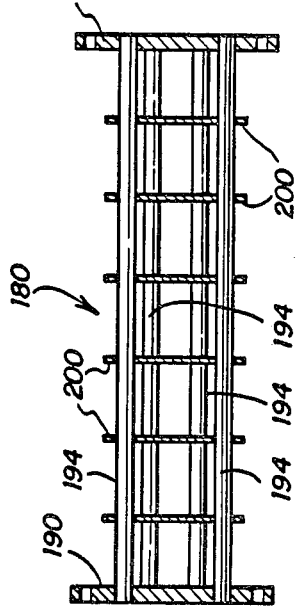
FIG. 8 is a longitudinal sectional elevation view of the tube sheet portion of the cooling means shown in FIG. 7.

As in the apparatus illustrated in FIGS. 1-6, it has been found that the throughput of a cooling device of the tube-in-shell type illustrated in FIGS. 7-8 can also be significantly increased by localized turbulent flow of the melt across the entire cross-section of the cooling device. As a result, a significant increse in throughput is also possible for ay extrusion line in which the cooling device is employed.

Turbulent flow is maintained across the cooling device by controlling the pressure drop through the individual tubes 194. This is preferably accomplished by creating an orifice in the upstream end of each tube 194. These orifices can be either of fixed size or of variable size, as will be discussed in more detail hereinbelow.

In carrying out this embodiment of the invention, it is preferred to use tubes having an internal diameter of between about ½ inch and about 2 inches. If the tube diameter becomes considerably smaller than ½ inch, the orifice must be made extremely small. This in turn causes a considerable pressure build-up, which actually contributes to an increase in temperature as the polymer passes through the cooling device, due to the resulting work energy. If the tubes have a diameter of more than about 2 inches, the heat transfer coefficient between polymer located near the center of the tube and the cooling medium becomes too low to accomplish efficient cooling. Tubes having an internal diameter of about 1 inch have been found to offer a good compromise between pressure drop and heat transfer coefficient.

Figure 9:
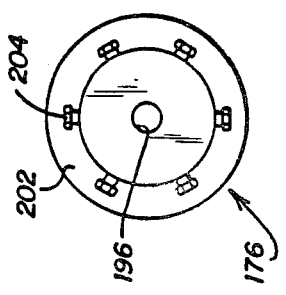
FIG. 9 is a transverse elevation view of the inlet end of the cooling means shown in FIG. 7.
Figure 10:
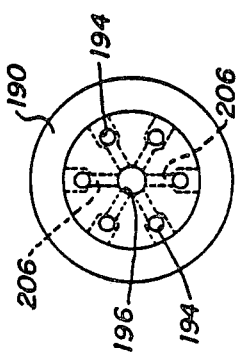
FIG. 10 is a transverse elevation view of the inlet end of the tube sheet portion of a cooling means of the type shown in FIG. 7.
Figure 13:
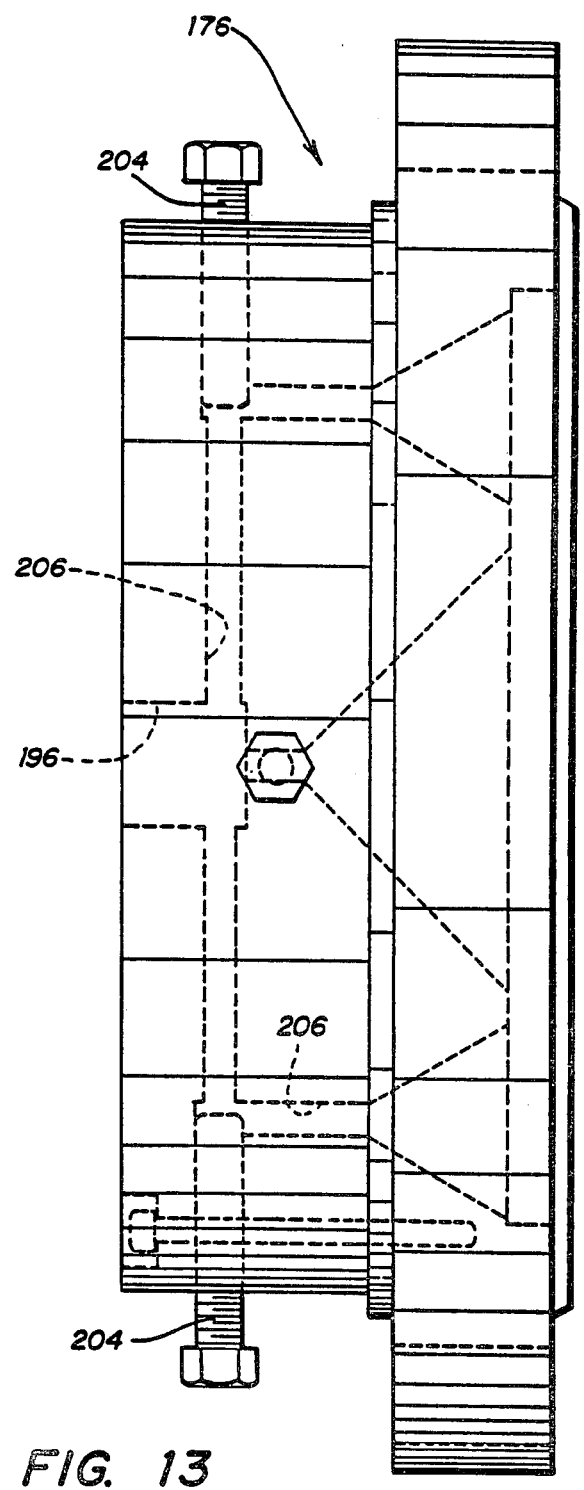
FIG. 13 is a sectional elevation view of the inlet valve assembly of the cooling means shown in FIG. 7.
Figure 14:
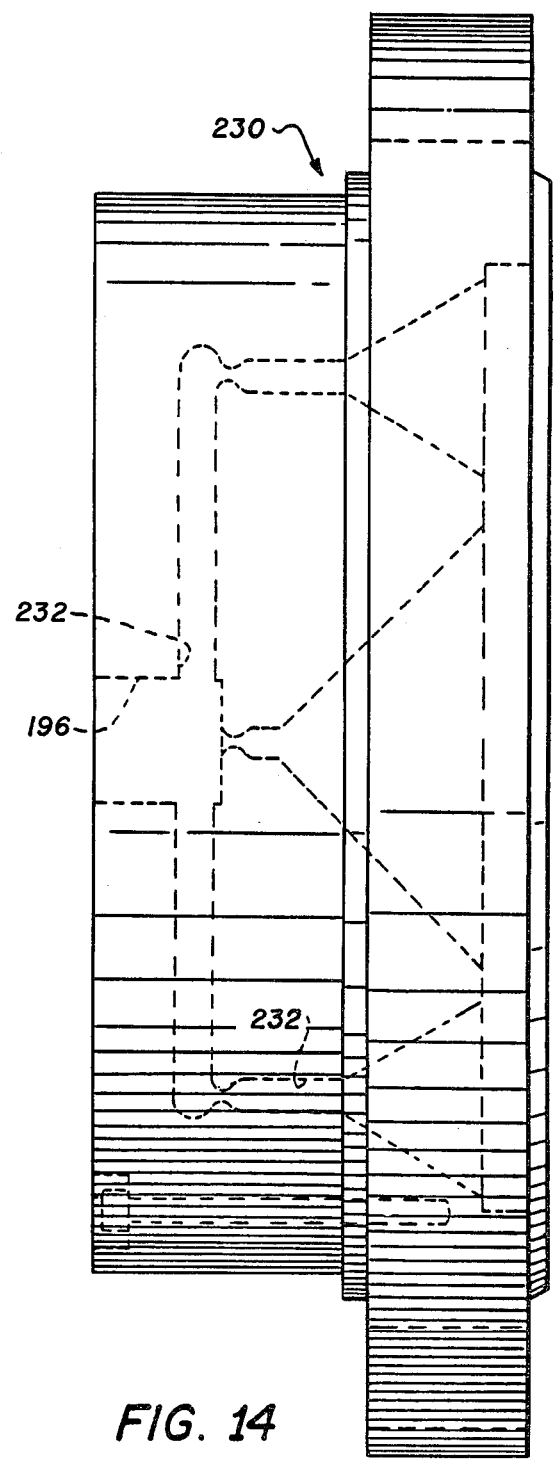
FIG. 14 is an isolated transverse elevation view of an intermediate plate which can be used in one embodiment of a cooling means of the type shown in FIG. 7.

One means of providing an orifice at the inlet end of each tube 194 is to position a valve in each tube, whereby a variable size orifice is provided. This embodiment of the invention is illustrated in FIGS. 7 and 9 of the drawings. In those figures, inlet valve assembly 176 comprises polymer inlet port 196, inlet flange plate 202, and a plurality of valves 204, one for each of the tubes 194. FIG. 9 depicts a transverse elevational view of inlet valve assembly 176. FIG. 10 depicts the configuration of an inlet polymer distribution device by which the flow of thermoplastic polymer composition through polymer inlet port 196 is divided and directed through passageways 206 to tubes 194. By including a separate valve 204 for each tube 194 to produce inlet valve assembly 176, shown in more detail in FIG. 13, it is possible to control the flow of thermoplastic composition through tubes 194 so as to maintain proper mixing across the cooling device and maximize heat transfer to the cooling medium circulating through shell 174.

Figure 12:
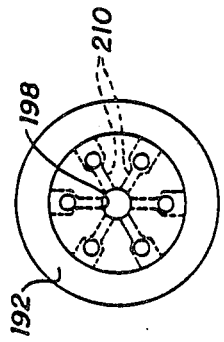
FIG. 12 is a transverse elevation view of the outlet end of the tube sheet portion of a cooling means of the type shown in FIG. 7.

FIG. 12 illustrates an outlet polymer collection device by which the flow of polymer through tubes 194 is collected via passageways 210 and fed into polymer outlet port 198.

Figure 11:
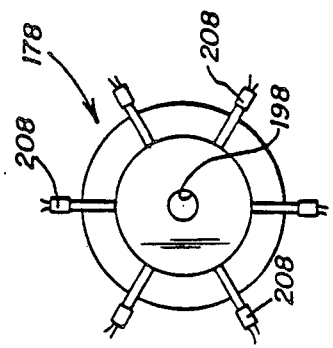
FIG. 11 is a transverse elevation view of the outlet end of the cooling means shown in FIG. 7.

According to one preferred embodiment of cooling means 172, the temperature of the thermoplastic composition exiting each tube 194 is monitored by thermocouples 208 positioned in outlet thermocouple assembly 178 as shown in FIGS. 7 and 11. For example, the thermocouples 208 may be positioned in the passageways 210 of the outlet polymer collection device shown in FIG. 12. When the temperature of the thermoplastic composition exiting any tube 194 becomes too great this indicates that the polymer is beginning to selectively channel through the particular tube. It is then possible to place this tube back into temperature balance by increasing the pressure drop by partially closing the corresponding valve 204 in inlet valve assembly 176 to increase the turbulence and in turn the mixing therein. It will be apparent that this control process can be done either manually or automatically through the use of conventional instrumentation operatively linking valves 204 with their respective thermocouples 208.

In an alternate embodiment, an orifice can be provided at the inlet end of each tube 194 by insertion of an intermediate plate 230 between the tube sheet flange 190 and inlet flange plate 202 of inlet polymer distribution device 220 shown in FIG. 10. Such an intermediate plate 230 is illustrated by itself in FIG. 14. Plate 230 is provided with a plurality of apertures 232 corresponding in number to the number of tubes 194 and positioned in plate 230 in the same spatial configuration as the tubes 194 are fixed within tube sheet 190. The size of apertures 232 must be predetermined to satisfy the mixing requirements for the particular tube size and polymer material which is to be processed. With this embodiment, it is a simple matter to adapt the extrusion apparatus for processing different polymeric materials, since a number of interchangable intermediate plates 230 having different aperture sizes can be provided, and the appropriate one can be readily inserted into the cooling means 172 as required.

Therefore, in accordance with the present invention, it is possible to run the extruder at a very high speed. This not only increases the throughput of the extruder line, but has the added benefit of producing an improved foamed product, i.e., a product with a more uniform cell size distribution because of improved dispersion of the blowing agent through the polymer.

By virtue of the increased efficiency in the cooling means achieved according to the invention, as a result of the mixing, pressure and velocity control maintained over the cooling means, the polymer can be brought to an extremely uniform temperature, i.e., there are no temperature gradients within the polymer mass. This is advantageous in a process for producing foamed thermoplastic products, since the resulting uniformity of expansion produces an improved product having a uniform density and cell structure.

With these foregoing features, the process according to the invention is especially well suited for extruding foamed products from thermoplastic polymers which require exact temperature control and uniformity just prior to being passed through the extrusion die orifice and thereafter expanded. Temperature uniformity is assured by the above-described measure of pressure control, flow velocity control, and localized mixing across the cooling device, and this in turn permits precise temperature control by the use of a cooling medium having a temperature which is kept at the final temperature desired for the polymer. As a result of the capability of precise temperature control, the process according to the invention is particularly suited for extrusion of foamed polymers having very critical temperature control constraints, such as polyethylene. In fact, it is even possible to provide at greatly increased rates foamed polyethylene products of excellent quality which contain high percentages of additives, such as fire-retardant additives.

By employing the process described herein, it is possible to achieve throughput rates up to about five times greater than those previously experienced in conventional extrusion processes. Furthermore, the subject apparatus permits the production of foamed thermoplastic compositions having significantly lower densities, smaller average cell size and more uniformity of cell size than those which can be made by conventional methods.

According to one particularly advantageous aspect of the present invention, the process is capable of producing a foamed product having surprisingly good flame-retardant properties. In fact, foamed polyethylene pipe insulation, of the type sold directly to consumers for installation on residential hot water piping systems, has been granted the sole approval of Underwriter's Laboratories for a product of that type.

This feature of the present invention involves the addition of a lubricant material which has been found to synergistically interact with the halogenated flame-retardant agent. The lubricant material is a synthetic wax based upon N,N', ethylene-bis-stearamide. It is available from Glyco Chemicals, Inc. of Greenwich, Conn. under the designation Acrawax C. It is believed that this compound reacts with the halogen contained in the flame-retardant agent to produce nitrogen, which has a flame-smothering effect. In accordance with this aspect of the invention, the stearamide compound is incorporated into the polymeric material in an amount of from about 0.02 to 0.5% by weight, preferably in an amount of from about 0.05 to about 0.15% by weight.

Suitable flame-retardant agents for use in conjunction with the ethylene-bis-stearamide include halogenated compounds, preferably bromine-containing compounds, which are sufficiently stable under extrusion conditions and which decompose under conditions of burning to liberate an amount of halogen sufficient to react with the stearamide compound. A person skilled in the art can readily select a suitable flame retardant compound from this well known class of materials based upon the foregoing criteria and simple experiments. The most preferred compound according to the invention is decabromo diphenyl oxide.

The flame-retardant is typically added to the polymer composition in an amount of from about 2 to 10% by weight, and preferably from about 4 to 6% by weight. These amounts are based upon an expanded product having a density within the range of about 2 to 4 lbs./ft.$^3$. As is well understood by the skilled artisan, these amounts will be increased slightly with increasing density of the foamed product.

The lubricant and flame-retardant can be incorporated into the polymer composition in a number of ways. For example, both can be mixed with the polymer feed in powdered form as the polymer is fed to the extruder. Alternatively, these components can be injected in liquid form directly into the barrel of the extruder and mixed with polymer therein.

Other combinations of nitrogen-containing compound and halogen-containing flame retardant can also be used with some success according to the invention, for example, combinations of compounds disclosed in U.S. Pat. No. 4,230,821 and U.S. Pat. application Ser. No. 22,257, (LAB-84) filed Mar. 20, 1979, the disclosures of which are incorporated by reference herein.

According to this particular feature of producing flame retardant products, other ingredients may advantageously be employed, e.g., up to about 10% by weight of a charring ingredient, such as antimony oxide and up to about 1% by weight of another lubricant, such as calcium stearate.

In the preferred embodiment of producing flame retardant foamed polyethylene for pipe insulation, there is preferably employed up to about 3% of an ionomer resin, e.g., a zinc ionomer resin sold by DuPont under the designation Surlyn and up to about 5% of a rubbery polymer to add flexibility, e.g., a styrene/butadiene block copolymer such as Phillips 416.

EXAMPLES 1-3

An extrusion line is set up essentially as illustrated in FIG. 15, employing a cooling device as illustrated in FIG. 2, but without the vanes 79. The apparatus comprises a 2½ inch extruder and a die for the production of 2 inch diameter pipe. High density polyethylene is used as the polymer material. Oil at a temperature of 340° F. is used as a coolant.

Figure 5:
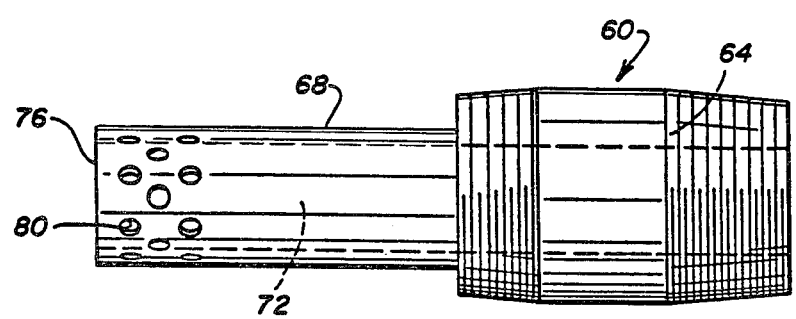
FIG. 5 is an elevation view of a preferred outlet nozzle means for the cooling means shown in FIGS. 1-3.

In a first experiment, inlet nozzle 54 and outlet nozzle 60 do not contain any of the orifices 78, 80, illustrated in detail in FIGS. 4 and 5. Instead, a gap of approximately ⅛ inch is left between each nozzle 54, 60 and its respective end wall of inner vessel 34. The polymer enters cooling device at approximately 500° F. and, because of an absence of localized mixing, exits the cooling device at a temperature slightly higher than 500° F.

In a second experiment, eight equally spaced circumferentially located inlet orifices 78 are provided having a diameter of 3/16 inch and eight similar outlet orifices 80 are provided having a diameter of ¼ inch. Again, the polymer enters the cooling device at approximately 500° F., but as a result of the flow control provided by the outlet and inlet orifices and possible localized mixing occurring there also, the polymer exits from the cooling device at a uniform temperature of about 340° F. A pressure of about 4800 psi is measured upstream of inlet orifices 78, whereas a pressure of about 1200 psi is measured upstream of outlet orifices 80.

In a third experiment, the procedure of the second experiment is repeated, except that the inlet orifices 78 have a diameter of ¼ inch and the outlet orifices 80 have a diameter of 5/16 inch. Similar results as regards polymer outlet temperature are achieved; however, the pressure measurements are about 2800 psi and 675 psi, respectively.

EXAMPLE 4

The process of the present invention is employed to produce a flame retardant pipe insulating material from polyethylene. A tubular extension arrangement is employed as illustrated in FIG. 15. The following composition is introduced into the extruder hopper:

440 parts high density polyethylene
32 parts carbon black
10 parts zinc ionomer resin (Surlyn)
10 parts styrene/butadiene block copolymer rubber (Phillips 416)
5 parts Acrawax C
1 part calcium stearate With 15 parts of the polyethylene resin there are compounded the following additives:

27 parts of decabromo diphenyl oxide
18 parts of antimony oxide

This compounded component is added to the extruder hopper with the foregoing ingredients.

A blowing agent comprised of a mixture of 80% Freon 114 and 20% Freon 11 is introduced into the barrel of the extruder. Freon 114 is 1,2-dichloro-1,1,2,2-tetrafluroethane and Freon 11 is trichlorofluoromethane. Blowing agent in the amount of approximately 20% by weight based upon the polymer mixture is employed.

The polymer composition is controlled in the cooling device to a temperature of between 220° and 230° F. and extruded through an annular die orifice to produce a tubular product. The density of the product, with flame retardant, is about 3.5 lb./ft.$^3$.

The embodiments of the invention in which an exclusive property or privilege is claimed is defined as follows:

1. A process for extruding thermoplastic resinous compositions, comprising the steps of:
   (a) heat plastifying the thermoplastic resinous composition in an extruder and forwarding same in an extrusion direction;
   (b) cooling the heat plastified thermoplastic resinous composition exiting from the extruder to a uniform temperature desired for extrusion through an extrusion die, said cooling step including conveying the heat plastified thermoplastic resinous composition through at least one enclosed flow path in a cooling device, circulating a cooling medium about the entire circumference of each of the resin flow paths and maintaining flow control orifices at the inlet and the outlet of the cooling device across substantially the entire cross-section of each of said resin flow paths; and
   (c) extruding the cooled thermoplastic resinous composition through an extrusion die, including a die orifice, positioned downstream of said cooling device.

2. A process according to claim 1, further comprising the step of injecting a blowing agent into the resinous composition during said heat plastifying step.

3. A process according to claim 1, wherein said thermoplastic resinous composition is selected from the group consisting of crystalline and amorphous polymers.

4. A process according to claim 3, wherein said thermoplastic resinous composition is selected from the group consisting of polystyrene, polyvinyl chloride, acrylonitrile-butadiene-styrene, polyethylene, polypropylene, and polyalkylene terephthalates.

5. A process according to claim 4, wherein said thermoplastic resinous composition comprises low density polyethylene.

6. A process according to claim 1, wherein the cooling medium comprises a low viscosity, temperature stable oil.

7. A process according to claim 2, wherein said blowing agent is selected from the group consisting of methyl chloride, carbon dioxide, ammonia, air, normal pentane, isopentane, fluorocarbons, and mixtures thereof.

8. A process according to claim 1, further comprising adding a nucleator selected from the group consisting of talc, powdered metals, and pigments to the resinous composition prior to said heat plastifying step.

9. A process according to claim 8, wherein said nucleator comprises particles which are able to pass through a 325 mesh screen.

10. A process according to claim 1, wherein said heat plastifying step is carried out in an extruder consisting of a single extruder screw.

11. A process according to claim 1, wherein said cooling step comprises conveying the resinous composition through a substantially cylindrical vessel having three generally concentrically arranged axial passageways, wherein the resinous composition is conveyed through an enclosed flow path comprising the middle passageway and wherein the cooling medium is circulated in the inner and outer passageways.

12. A process according to claim 11, wherein said cooling step further comprises uniformly distributing the heat plastified thermoplastic resinous composition about the entire cross-section of the enclosed flow path.

13. A process according to claim 1, wherein said cooling step comprises conveying the resinous composition through a plurality of tubes positioned in a shell member to define a plurality of said enclosed flow paths for conveying the heat plastified thermoplastic resinous composition, and circulating the cooling medium about the tubes in the shell member.

14. A process according to claim 13 further comprising passing the resinous composition through an orifice of reduced size positioned in the upstream end of each of the tubes.

15. A process according to claim 14, further comprising the step of selectively adjusting by means of valves the size of said orifices in response to conditions of the resinous composition at the exit end of each tube.

16. A process according to claim 15, wherein said cooling step further comprises measuring the temperature of the heat plastified thermoplastic resinous composition exiting from each tube, and thereafter selectively adjusting said orifice sizes to maintain relatively equivalent temperatures of the resinous composition exiting each said tube.

17. A process according to claim 1, further comprising the step of maintaining a volume of resinous composition in the volume of said enclosed flow paths in said cooling device larger than the volume of heat plastified thermoplastic resinous material in the extruder.

18. A process according to claim 17, wherein the volume of resinous composition in said enclosed flow paths in said cooling device is at least about 5 times larger than the volume of heat plastified resinous material in the extruder.

19. A process according to claim 2, further comprising including in the resinous composition from about 0.02 to about 0.5% by weight N,N', ethylene-bis-stearamide and from about 2 to about 10% by weight of a halogen containing flame retardant agent which is stable under the heat plastifying conditions but decomposes under burning conditions to produce an amount of halogen sufficient to react with the N,N', ethylene-bis-stearamide to liberate nitrogen and create a flame smothering effect.

20. A process according to claim 19, wherein said flame retardant comprises decabromo diphenyl oxide.

21. A process according to claim 14, further comprising the step of selectively adjusting by means of interchangeable flanges having fixed apertures therein the size of the orifices in response to conditions of the resinous composition at the exit end of each tube to maintain a desirable exit temperature in all of the exiting resinous material.

22. A process according to claim 15, wherein said adjusting step comprises varying said aperture sizes during operation by means of valves.

* * * * *